UNITED STATES PATENT OFFICE.

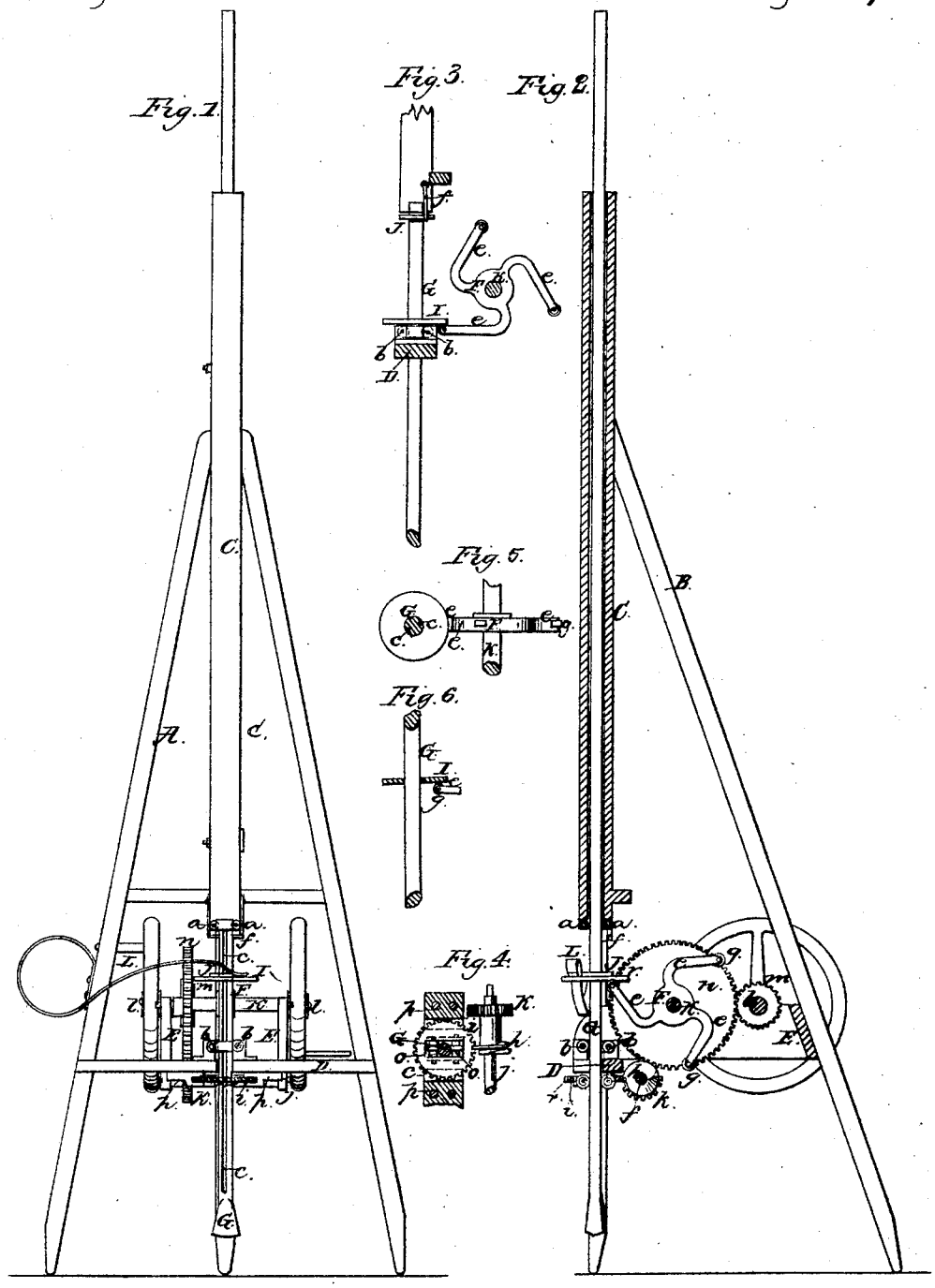

EDWIN G. DUNHAM, OF PORTLAND, CONNECTICUT.

ROCK-DRILL.

Specification of Letters Patent No. 11,779, dated October 10, 1854.

*To all whom it may concern:*

Be it known that I, EDWIN G. DUNHAM, of Portland, in the county of Middlesex and State of Connecticut, have invented certain new and useful Improvements in Stone or Rock Drills; and I do hereby declare that the following is a full, clear, and exact description of the same, reference being had to the accompanying drawings, forming part of this specification, in which—

Figure 1, is a front elevation of one of my improved stone drilling machines, ready for commencing the drilling operation, the drill being raised. Fig. 2, is a vertical longitudinal central section of the same. Fig. 3, is a broken and detached longitudinal section of the drilling machine, ready for raising the bar entirely out of the hole which may have been drilled. This view shows the inclined position of the friction plate when it is biting upon the drill bar,— also, the inclination and position of the second friction plate which catches and holds the bar as fast as it is raised by the first friction plate. Fig. 4, is a detached horizontal section of an arrangement for turning the drill bar simultaneous with the vertical movement. Fig. 5, is a plan of the first friction plate, arranged on the drill bar. Fig. 6, is a vertical section of the same, inclined and biting upon the drill bar.

My invention consists in arranging a horizontal ring plate loosely on the drill rod, and operating upon said plate by means of a lifter, in such a manner that it will be caused to incline slightly during the raising of the drill bar, and consequently to bite upon said bar, and hold it firmly until it is raised to the position desired, and then again to assume nearly a horizontal position, and allow the drill bar to fall. The said plate always falling with the bar, and sliding up over the same, as the hole increases in depth.

My invention consists, second, in increasing the friction of the plate upon the drill bar, and accelerating the descent and blow of the drill bar by means of a spring arranged in the manner hereinafter described.

My invention consists, third, in rendering the friction plate for raising and dropping the drill bar capable of removing said bar entirely out of the holes which may have been drilled by employing in connection with it another similar friction plate on the bar; said second friction plate being always inclined when in use, and retained so by a swinging bracket shaped catch, and consequently, as the rod is gradually raised, said plate bites upon and prevents it falling. This second friction plate, when not in use, is allowed to slide down over the rod, and rest upon the first plate, it aiding, when thus positioned, in raising the drill bar.

My invention consists, fourth, in the manner hereinafter specified, of providing the worm wheel which turns the drill bar with two antifriction rollers, which are so constructed and arranged, that they prevent friction on the bar as it rises and falls, and also in connection with the worm and wheel, cause it to revolve when the machine is in motion.

To enable others skilled in the art, to make and use my invention, I will proceed to describe its construction and operation.

The frame of the drill may be made of any suitable material, it consisting of two front posts, A, A, and one inclined back post, B, as shown in the drawing—the top ends of which are bolted to the central drill box, C, as represented, and the lower portion of the front posts are united together by the girt, D. This girt supports the frame, E, in which the mechanism for operating the lifter, F, is hung, said frame, E, being bolted to the hind post, B, and the girt, D.

G, is the drill bar,—it moves freely up and down in the box, C,—said box is made in two sections which are hinged together, and secured by clasps at top and bottom. This box can be opened when it is desired, and the drill taken out with ease and despatch. The lower end of this box is provided with four antifriction rollers, *a, a,* between which the drill bar moves,—there are also four more similar rollers, *b, b,* arranged on top of the girt, D, between which the drill also moves. These rollers serve to prevent friction, and keep the bar in proper position. The metal drill bar, G, is made round with two V shaped grooves, *c,* of its full length cut in it,—the object of these grooves will be described presently.

I, is the first friction plate, placed loosely on the drill bar, as shown in Fig. 5. This plate has a round hole in its center, through which the drill passes,—this hole is made of a little greater diameter than the drill bar, so that the bar may slide freely through the same, and also that the plate may be inclined and made to bite on the bar, in the manner shown in Fig. 6, when one of the arms, e, of the lifter, F, is brought in contact with the under surface of the plate, I, in the manner shown in Figs. 2 and 3.

J, is the small friction plate for catching and holding the bar, as it is gradually raised by the plate, I. This plate occupies the position shown in Figs. 1 and 2, when not in use for holding the bar as it is gradually raised out of the hole after it has been drilled, and it occupies the position shown in Fig. 3; when it is in use for that purpose— the catch, f, giving it the inclination, and keeping it in the position shown in Fig. 3, and causing it to hold and bite on the drill bar in the manner shown in Fig. 6.

The lifter, F, is constructed with three arms, e, e, e, which are so arranged, as shown in the drawing, that they raise the drill bar three times for every revolution of the shaft, K, upon which they are arranged. The ends of the arms, e, each have an antifriction roller, g, secured in them for preventing friction on the plate, I, in raising the drill bar.

L, is the spring for accelerating the descent and blow of the drill, and also increasing the friction of the plate I—the arrangement and construction of this spring will be clearly seen in Figs. 1 and 2. The force of this spring can be regulated by winding it up or unwinding, as desired.

h, is the worm, and, i, the wheel in which it works for turning the drill bar. The thread of the device, lettered, h, is made straight for a portion of its diameter, while the other portion is made of vermicular form—said spiral portion serving to turn the drill bar when it is out of the hole, and the straight portion allowing of the worm wheel turning without operating on the bar while in the hole; thus all liability of the tool being broken, is avoided. This worm is secured on the shaft, j, which carries a small pinion, k,—it is by this pinion that the worm is set in motion—motion being transmitted to said pinion from the driving shaft, l, through the small wheel, m, and spur, n. The spur, n, being secured on the shaft of the lifter, F. The worm wheel, i, has an opening in its center, through which the drill bar passes, and in which two small antifriction rollers, o, o, are secured—they having their bearing in said wheel, i,—these rollers, o, o, have each a bead round the center of their periphery, which fit in the grooves, c, c, in the drill bar, and cause said bar to turn when motion is communicated to the worm and its wheel. The bar is kept in place, saved from wearing, and caused to turn, by said rollers, etc. The drill bar serves as the axis for the worm wheel to turn upon. The worm wheel fits and turns in the grooves of the pieces, p, p, secured to the under surface of the girt, D, as shown in Fig. 1, and is kept in place by the drill bar and rollers, o, o.

The pinion, k, makes three revolutions for every one of the spur, n, and consequently the drill bar is turned every time it is raised.

The operation is as follows: Motion is communicated to the driving or double crank shaft, l, by hand or otherwise, from which, motion is communicated to the lifter shaft, K, through the small pinion, m, and spur, n,—the spur also causing the small pinion, k, to revolve, and consequently the worm and its wheel. As the lifter shaft revolves, each of its arms come in contact with the friction plate, I, and in endeavoring to escape by it incline it slightly and cause it to bite very rigidly upon the bar as the lifter raises the plate and bar together, and simultaneous with the raising of the bar, the worm and its wheel turns it. After the bar is raised its full height, and the lever escapes from under the plate I, the hold of said plate is released, and it assumes nearly a horizontal position, and it and the bar descend together. To raise the bar out of the hole entirely the spring, L, must be moved out of contact with the friction plate, I, so as to allow of the plate descending freely by its own gravity, independent of the drill bar when the lifter escapes from under it. The second friction plate, J, must be moved to the position in Fig. 3, and held at an inclination by the bracket shaped catch—this plate being properly arranged, the lifter is turned as before, and the first friction plate, I, will raise the drill bar gradually out of the hole— the small plate retaining it elevated until it is drawn entirely up. After this the plate is moved down to the position shown in Fig. 2, and made to serve for raising the bar.

What I claim as my invention, and desire to secure by Letters Patent, is:

1. So arranging a horizontal plate on the drill rod that by bringing the lifter in contact with it in the manner described, it will be caused to incline slightly during the raising of the drill bar, and consequently to bite or impinge upon said bar, and hold it firmly until it is raised to the position desired, and then as the lifter escapes, again assume nearly a horizontal position, quit its hold, and fall with the drill, substantially as, and for, the purpose set forth.

2. I also claim, rendering the friction plate for raising and dropping the drill bar, capable of removing said bar entirely out of the holes which are drilled, by employing in connection with it, the friction plate, J, which is set inclined, and made to hold the bar as it is gradually raised, in the manner substantially as herein described.

3. I claim the plate, J, when set, inclining sufficiently to hold the drill, while it is being raised out of the holes that are drilled, whether it be used in connection with the friction plate, I, or other arrangements in use for raising the drill bar.

4. I claim increasing the friction of the plate, I, upon the drill bar, and accelerating the descent and blow of the drill bar, by means of a spring arranged in the manner herein described.

EDWIN G. DUNHAM.

Witnesses:
 GUY COOPER,
 STEPHEN G. COOPER.